United States Patent
Lee et al.

(10) Patent No.: US 12,249,703 B2
(45) Date of Patent: Mar. 11, 2025

(54) NEGATIVE ELECTRODE ACTIVE MATERIAL FOR LITHIUM SECONDARY BATTERY AND LITHIUM SECONDARY BATTERY COMPRISING THE SAME

(71) Applicant: LG CHEM, LTD., Seoul (KR)

(72) Inventors: Su-Min Lee, Daejeon (KR); Je-Young Kim, Daejeon (KR); Sun-Young Shin, Daejeon (KR); Yong-Ju Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 865 days.

(21) Appl. No.: 17/042,514

(22) PCT Filed: Jun. 12, 2019

(86) PCT No.: PCT/KR2019/007098
§ 371 (c)(1),
(2) Date: Sep. 28, 2020

(87) PCT Pub. No.: WO2019/240496
PCT Pub. Date: Dec. 19, 2019

(65) Prior Publication Data
US 2021/0028438 A1    Jan. 28, 2021

(30) Foreign Application Priority Data
Jun. 12, 2018  (KR) .................. 10-2018-0067287

(51) Int. Cl.
*H01M 4/131*  (2010.01)
*H01M 4/133*  (2010.01)
(Continued)

(52) U.S. Cl.
CPC ........... *H01M 4/131* (2013.01); *H01M 4/133* (2013.01); *H01M 4/134* (2013.01); *H01M 4/366* (2013.01);
(Continued)

(58) Field of Classification Search
None
See application file for complete search history.

(56) References Cited

U.S. PATENT DOCUMENTS

| | | | |
|---|---|---|---|
| 10,170,757 B2 | 1/2019 | Watanabe | |
| 2013/0045419 A1* | 2/2013 | Chun ................. | C01B 33/146 423/325 |

(Continued)

FOREIGN PATENT DOCUMENTS

| | | |
|---|---|---|
| CN | 106660813 A | 5/2017 |
| CN | 108352521 A | 7/2018 |

(Continued)

OTHER PUBLICATIONS

International Search Report issued in PCT/KR2019/007098 (PCT/ISA/210), dated Sep. 19, 2019.
(Continued)

*Primary Examiner* — Amanda J Barrow
(74) *Attorney, Agent, or Firm* — Birch, Stewart, Kolasch & Birch, LLP

(57) ABSTRACT

A negative electrode active material for a lithium secondary battery, including silicon oxide particles, wherein the silicon oxide has a full width at half maximum peak ranging between 2 and 6 in a particle size distribution and the silicon oxide particles have an average particle size (D50) of 1 μm to 20 μm, and a negative electrode and a lithium secondary battery comprising the same. The negative electrode active material according to the disclosure has outstanding life performance and output performance.

9 Claims, 1 Drawing Sheet

(51) Int. Cl.
*H01M 4/134* (2010.01)
*H01M 4/36* (2006.01)
*H01M 4/38* (2006.01)
*H01M 4/66* (2006.01)
*H01M 10/0525* (2010.01)
*H01M 4/02* (2006.01)

(52) U.S. Cl.
CPC ............ *H01M 4/386* (2013.01); *H01M 4/66* (2013.01); *H01M 10/0525* (2013.01); *H01M 2004/027* (2013.01)

(56) References Cited

U.S. PATENT DOCUMENTS

| | | |
|---|---|---|
| 2013/0266865 A1 | 10/2013 | Kwon et al. |
| 2016/0156031 A1 | 6/2016 | Kim et al. |
| 2016/0233484 A1 | 8/2016 | Hirose et al. |
| 2017/0125806 A1* | 5/2017 | Wang ........................ H01M 4/48 |
| 2017/0179476 A1* | 6/2017 | Watanabe ............. H01M 4/625 |
| 2017/0317380 A1* | 11/2017 | Takijiri ................. H01M 4/483 |
| 2018/0026257 A1* | 1/2018 | Oh ........................ H01M 4/386 |
| | | 429/231.8 |
| 2018/0062158 A1* | 3/2018 | Kim ....................... H01M 4/364 |
| 2018/0090750 A1* | 3/2018 | Oh ........................ H01M 4/483 |
| 2018/0323424 A1 | 11/2018 | Hirose et al. |
| 2019/0198869 A1 | 6/2019 | Park et al. |
| 2020/0227731 A1* | 7/2020 | Shin ...................... H01M 4/583 |

FOREIGN PATENT DOCUMENTS

| | | | | |
|---|---|---|---|---|
| EP | 2 966 037 A1 | | 1/2016 | |
| JP | 2009-205950 A | | 9/2009 | |
| JP | 2011-90869 A | | 5/2011 | |
| JP | 2013-69633 A | | 4/2013 | |
| JP | 6127370 B2 | | 5/2017 | |
| JP | 2017-97955 A | | 6/2017 | |
| JP | 2017-188319 A | | 10/2017 | |
| JP | 2017-204374 A | | 11/2017 | |
| JP | 2018-88406 A | | 6/2018 | |
| JP | 2018-190746 A | | 11/2018 | |
| KR | 10-2013-0139555 A | | 12/2013 | |
| KR | 10201401327291 | * | 11/2014 | ............ H01M 4/133 |
| KR | 10-1513820 B1 | | 4/2015 | |
| KR | 10-2016-0065028 A | | 6/2016 | |
| KR | 10-2016-0118274 A | | 10/2016 | |
| KR | 10-1711985 B1 | | 3/2017 | |
| KR | 10-1725965 B1 | | 4/2017 | |
| WO | WO 2012/077268 | * | 6/2012 | ............. H01M 4/36 |
| WO | WO 2018/038535 A2 | | 3/2018 | |

OTHER PUBLICATIONS

Extended European Search Report for European Application No. 19819890.5, dated Apr. 19, 2021.

\* cited by examiner

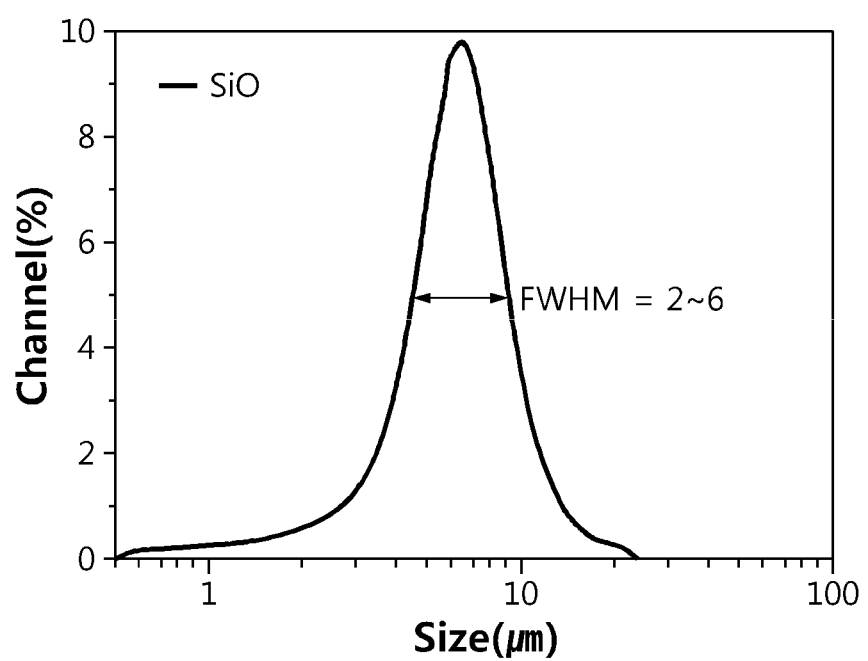

NEGATIVE ELECTRODE ACTIVE MATERIAL FOR LITHIUM SECONDARY BATTERY AND LITHIUM SECONDARY BATTERY COMPRISING THE SAME

TECHNICAL FIELD

The present application claims the benefit of Korean Patent Application No. 10-2018-0067287 filed on Jun. 12, 2018 with the Korean Intellectual Property Office, the disclosure of which is incorporated herein by reference in its entirety.

The present disclosure relates to a negative electrode active material for a lithium secondary battery, and more particularly, to a negative electrode active material for a lithium secondary battery with improved life performance and output performance.

BACKGROUND ART

With the technology development and growing demand for mobile devices, the demand for secondary batteries as an energy source dramatically increases. In secondary batteries, lithium secondary batteries are widely used in commercial applications due to their high energy density and voltage, long cycle life, and low discharge rate.

A lithium secondary battery has a structure in which an electrode assembly including a positive electrode and a negative electrode, each having an active material applied on an electrode current collector, with a porous separator interposed between, is impregnated with an electrolyte containing a lithium salt, and the electrode is manufactured by applying, to a current collector, a slurry containing an active material, a binder and a conductive material dispersed in a solvent, followed by drying and pressing.

Additionally, the basic performance characteristics of the lithium secondary battery, namely, capacity, output and life, are greatly influenced by the negative electrode material. For maximum battery performance, the negative electrode active material needs to satisfy the requirements that its electrochemical reaction potential should be close to that of lithium metal, reaction reversibility with lithium ions should be high and diffusion of lithium ions in the active material should be fast, and a carbon-based material is widely used as a material satisfying these requirements.

The carbon-based active material is good at stability and reversibility, but has capacity limitation. Accordingly, recently, a Si-based material having high theoretical capacity is applied as a negative electrode active material in the field of industry requiring high capacity batteries, for example, electric vehicles and hybrid electric vehicles.

However, the Si-based negative electrode active material changes in crystal structure when absorbing and storing lithium, causing the volume to expand. The volume expansion causes cracking, and thus separation of active material particles or poor contact between the active material and the current collector occurs, resulting in shorter battery charge/discharge cycle life.

Meanwhile, it is reported that silicon oxide among the Si-based negative electrode active material less expands in the battery reaction and shows more stable life than silicon. However, due to its low conductivity and specific surface area and expansion/contraction involved in charging/discharging, silicon oxide still shows unstable life in the battery performance.

DISCLOSURE

Technical Problem

To solve the above-described problem, the present disclosure is directed to providing a negative electrode active material of silicon oxide with improved life performance and output performance.

The present disclosure is further directed to providing a negative electrode including the negative electrode active material and a lithium secondary battery including the same.

Technical Solution

According to an aspect of the present disclosure, there is provided a negative electrode active material for a lithium secondary battery, comprising silicon oxide particles, wherein the silicon oxide particles have a full width at half maximum (FWHM) peak ranging between 2 and 6 in a particle size distribution and the silicon oxide particles have an average particle size (D50) of 1 µm to 20 µm.

The FWHM of the silicon oxide particles may range between 3 and 5.

The silicon oxide particles may be represented by $SiO_x$ ($0 < x \leq 2$).

The particle size distribution of the silicon oxide particles may be adjusted using an air classifying mill.

The silicon oxide particles may be silicon oxide doped with a metal of lithium, magnesium, calcium or aluminum.

The silicon oxide particles may include at least one of primary particles and secondary particles formed by agglomeration of the primary particles.

The negative electrode active material for a lithium secondary battery may further comprise at least one of graphite, soft carbon, or hard carbon.

According to another aspect of the present disclosure, there is provided a negative electrode comprising a current collector, and a negative electrode active material layer disposed on at least one surface of the current collector, wherein the negative electrode active material layer comprises the negative electrode active material for a lithium secondary battery as described above, and a lithium secondary battery comprising the same.

Advantageous Effects

The negative electrode active material for a lithium secondary battery according to an aspect of the present disclosure includes a specific silicon oxide, namely, silicon oxide satisfying the full width at half maximum (FWHM) of the peak ranging between 2 and 6 in the particle size distribution of the average particle size (D50) of 1 to 20 µm, thereby improving the life performance and output performance of the secondary battery.

BRIEF DESCRIPTION OF DRAWINGS

The accompanying drawings illustrate preferred embodiments of the present disclosure and, together with the foregoing disclosure, serve to provide further understanding of the technical features of the present disclosure. However, the present disclosure is not to be construed as being limited to the drawings.

FIG. 1 The FIGURE shows a particle size distribution graph of silicon oxide for a negative electrode active material according to an embodiment of the present disclosure.

BEST MODE

Hereinafter, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

A negative electrode active material for a lithium secondary battery according to an embodiment of the present disclosure includes silicon oxide.

The silicon oxide is represented by $SiO_x(0<x\leq2)$, and may include a nanocomposite structure of a mixture of Si and Sift, or Sift alone and its composition x may be determined by a ratio of silicon and oxygen. For example, when $Si:SiO_2$ are mixed at a mole ratio of 1:1 in the $SiO_x(0<x\leq2)$, SiO (x=1) may be represented.

The silicon oxide included in the negative electrode active material for a lithium secondary battery according to an embodiment of the present disclosure has an average particle size (D50) of 1 to 20 µm, in particular 3 to 10 µm, and in this particle size distribution, the full width at half maximum (FWHM) of the peak satisfies the range between 2 and 6, in particular, between 3 and 5.

In the specification, the 'average particle size (D50)' refers to a particle size corresponding to 50% cumulative volume on the basis of particle mass in a particle size distribution determined by laser diffraction particle size distribution measurements.

In the specification, the 'full width at half maximum (FWHM)' is an numerical expression of the extent of uniformity of the particle size distribution, and for example, may be calculated by fitting a particle size distribution curve using Lorentzian distribution, and in the distribution curve of a single peak, determining the width at ½ of the peak. In this way, the FIGURE shows a particle size distribution graph of silicon oxide for a negative electrode active material according to an embodiment of the present disclosure, where 'Channel (%)' on the y-axis is on a volume percent basis.

According to the present disclosure, when the silicon oxide particles having the average particle size (D50) of 1 to 20 µm satisfy the FWHM of 2 to 6, optimum contact and pores between particles are maintained in the manufacture of the electrode, leading to improved life and output performance.

Meanwhile, when the FWHM of the silicon oxide particles is smaller than 2, the contact between particles reduces due to the presence of too much particles of the same size, resulting in life performance degradation. When the FWHM of the silicon oxide particles is larger than 6, the particle size distribution is ununiform and the contact between particles increases too much, resulting in pore clogging and increased resistance, as a consequence, output performance degradation.

As in the present disclosure, the silicon oxide particles satisfying the FWHM of 2 to 6 in the particle size distribution of the average particle size (D50) of 1 to 20 µm may be silicon oxide having the controlled size by separating into very small particles (fine powder) and large particles (coarse powder) by an air classifying mill. The air classifying mill is a special pulverizer with an air separator, and is advantageous for particle size adjustment because it has high pulverization efficiency and suppresses overpulverization. The particle size distribution of a material may be controlled at a desired level by inputting the corresponding material into the air classifying mill and operating the air separator at the adjusted rotational speed. For example, the air separator may operate in the range of 6,000 to 9,000 rpm, in particular 7,000 to 8,000 rpm.

In an embodiment of the present disclosure, the silicon oxide may include silicon oxide doped with metal of lithium, magnesium, calcium or aluminum to improve the initial efficiency and life performance. The doping may be performed by mixing the silicon oxide with metal of lithium, magnesium, calcium or aluminum and performing heat treatment. In this instance, the heat treatment may be performed at 850 to 1050° C., in particular 900 to 1000° C. for 1 to 3 hours, taking into account the melting point and the boiling point of the metal component used for silicon oxide doping. In the doping, at least one metal powder of lithium, magnesium, calcium and aluminum may be present in an amount of 1 to 50 weight %, particularly 2 to 30 weight %, more particularly 3 to 20 weight % relative to the silicon oxide content to provide a sufficient initial efficiency improvement effect without a great reduction in discharge capacity.

In an embodiment of the present disclosure, the silicon oxide may include at least one of primary particles and secondary particles formed by agglomeration of the primary particles. When the silicon oxide is a secondary particle type, agglomeration between particles may be obtained as a result of sintering a carbon based binder that binds the particles, for example, a carbon based precursor such as pitch. The agglomerated secondary particle type silicon oxide is advantageous for improved life performance of the lithium secondary battery.

In addition, together with the silicon oxide as described above, the negative electrode active material according to an embodiment of the present disclosure may further include graphite, for example, natural graphite or artificial graphite, or soft carbon and hard carbon. That is, the silicon oxide may be used alone, or in combination with the carbon based material.

In the present disclosure, when graphite is used together with the silicon oxide, the graphite may have the average particle size (D50) of 9 to 30 µm, in particular 10 to 20 µm, and when mixed with the silicon oxide, may increase the adhesive strength between the current collector and the negative electrode layer, and control the volume expansion of the negative electrode layer during charging/discharging, thereby further improving the life performance without output performance degradation.

The graphite may be used such that the weight ratio of graphite and silicon oxide is 99:1 to 30:70, for example, 95:5 to 70:30, and when the above-described range is satisfied, it is advantageous in terms of output performance maintenance and life performance improvement of the battery.

Another embodiment of the present disclosure relates to a negative electrode including the negative electrode active material with improved life performance and output performance as described above.

In detail, the negative electrode according to an embodiment of the present disclosure includes a current collector, and a negative electrode active material layer including the negative electrode active material according to the present disclosure on at least one surface of the current collector.

The electrode layer may be formed by coating, on at least one surface of the current collector, a slurry for a negative electrode active material layer obtained by dispersing the negative electrode active material according to the present disclosure, a binder and a conductive material in a solvent, followed by drying and pressing.

The current collector is not particularly limited if it causes no chemical change in the battery and has conductivity, and may include, for example, copper, stainless steel, aluminum, nickel, titanium, sintered carbon, copper or stainless steel surface-treated with carbon, nickel, titanium or silver, and aluminum-cadmium alloy. The thickness of the current collector is not particularly limited, but may have the thickness of 3-500 μm as commonly applied.

The negative electrode active material may be present in an amount of 80 weight % to 99 weight % based on the total weight of the negative electrode slurry composition.

The binder is a component that aids bonding between the conductive material, and the active material, or the current collector, and is generally present in an amount of 0.1 to 20 weight % based on the total weight of the negative electrode slurry composition. Examples of the binder include polyvinylidene fluoride-co-hexafluoropropylene (PVDF-co-HEP), polyvinylidenefluoride, polyacrylonitrile, polymethylmethacrylate, polyvinylalcohol, carboxylmethylcellulose (CMC), starch, hydroxypropylcellulose, regenerated cellulose, polyvinylpyrrolidone, polytetrafluoroethylene, polyethylene, polypropylene, polyacrylic acid, styrene butadiene rubber (SBR) or lithium polyacrylate (Li-PAA). Among them, in particular, the lithium polyacrylate (Li-PAA) may give a higher adhesive strength than other binder, for example, SBR/CMC when used in a negative electrode having a high silicon content of about 80% in the active material, and due to this feature, it is advantageous in terms of achieving high capacity retention during charging/discharging when used in a Si-based negative electrode.

The conductive material is not particularly limited if it causes no chemical change in the corresponding battery and has conductivity, and may include, for example, carbon black such as carbon black, acetylene black, ketjen black, channel black, furnace black, lamp black or thermal black; a conductive fiber, for example, a carbon fiber or a metal fiber; fluorocarbon; metal powder, for example, aluminum or nickel powder; conductive whisker, for example, zinc oxide, potassium titanate; conductive metal oxide, for example, titanium oxide; or a conductive material, for example, a polyphenylene derivative. The conductive material may be added in an amount of 0.1 to 20 weight % based on the total weight of the negative electrode slurry composition.

The dispersion medium may include an organic solvent such as water or N-methyl-2-pyrrolidone (NMP), and may be used in such an amount for the desirable viscosity when the negative electrode slurry includes the negative electrode active material, and optionally, the binder and the conductive material.

Additionally, the coating method of the negative electrode slurry is not limited to a particular type, and includes any coating method commonly used in the art. For example, a coating method using a slot die may be used, and besides, a Meyer bar coating method, a Gravure coating method, a dip coating method, a spray coating method, etc. may be used.

Still another embodiment of the present disclosure relates to a lithium secondary battery including the negative electrode. In detail, the lithium secondary battery may be manufactured by injecting a lithium salt containing electrolyte into an electrode assembly including a positive electrode, a negative electrode as described above and a separator interposed between.

The positive electrode may be manufactured by mixing a positive electrode active material, a conductive material, a binder and a solvent to prepare a slurry, and directly coating the slurry on a metal current collector, or laminating, on a metal current collector, a positive electrode active material film cast on a separate support and peeled off from the support.

The active material used for the positive electrode is active material particles of any one selected from the group consisting of $LiCoO_2$, $LiNiO_2$, $LiMn_2O_4$, $LiCoPO_4$, $LiFePO_4$ and $LiNi_{1-x-y-z}CoxM1_yM2_zO_2$ (M1 and M2 are independently any one selected from the group consisting of Al, Ni, Co, Fe, Mn, V, Cr, Ti, W, Ta, Mg and Mo, and x, y and z are independently atomic fractions of elements in the oxide composition, where $0 \leq x \leq 0.5$, $0 \leq y < 0.5$, $0 \leq z < 0.5$, $0 < x+y+z < 1$), or any mixtures thereof.

Meanwhile, the conductive material, the binder and the solvent may be the same as those used in manufacturing the negative electrode.

The separator may include a general porous polymer film conventionally used for separators, for example, a porous polymer film made of a polyolefin-based polymer such as ethylene homopolymer, propylene homopolymer, ethylene/butene copolymer, ethylene/hexene copolymer and ethylene/methacrylate copolymer, used singly or in stack. Additionally, an insulating thin film having high ion permittivity and mechanical strength may be used. The separator may include a safety reinforced separator (SRS) having a thin coating of a ceramic material on the separator surface. Further, a general porous nonwoven fabric, for example, a nonwoven fabric made of high melting point glass fibers or polyethyleneterephthalate fibers may be used, but is not limited thereto.

The electrolyte solution includes a lithium salt as an electrolyte and an organic solvent for dissolving it.

The lithium salt includes those commonly used in an electrolyte solution for a secondary battery without limitation, and for example, an anion of the lithium salt may include at least one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The organic solvent included in the electrolyte solution is not limited to a particular type and may include commonly used types, and may typically include at least one selected from the group consisting of propylene carbonate, ethylene carbonate, diethylcarbonate, dimethylcarbonate, ethylmethylcarbonate, methylpropylcarbonate, dipropylcarbonate, dimethylsulfoxide, acetonitrile, dimethoxyethane, diethoxyethane, vinylenecarbonate, sulfolane, γ-butyrolactone, propylenesulfite and tetrahydrofuran.

Particularly, among the carbonate-based organic solvents, cyclic carbonate such as ethylenecarbonate and propylenecarbonate is an organic solvent with high viscosity and may be preferably used because of allowing favorable dissolution of the lithium salt in the electrolyte by virtue of a high dielectric constant. When such cyclic carbonate is mixed with linear carbonate, which has a low viscosity and a low dielectric constant, such as dimethyl carbonate and diethyl carbonate at a proper ratio, it is possible to form an electrolyte solution having high electrical conductivity.

Optionally, the electrolyte solution stored according to the present disclosure may further include an additive such as an overcharge inhibitor conventionally included in electrolyte solutions.

The lithium secondary battery according to an embodiment of the present disclosure may be manufactured by interposing the separator between the positive electrode and the negative electrode to form an electrode assembly, putting the electrode assembly in, for example, a pouch, a cylindrical battery case or a prismatic battery case, and injecting the electrolyte. Alternatively, the electrode assembly is stacked and impregnated with the electrolyte solution, and the obtained result is put in the battery case, which in turn, is sealed, bringing the lithium secondary battery into completion.

According to an embodiment of the present disclosure, the lithium secondary battery may be a stack type, a winding type, a stack and folding type or a cable type.

The lithium secondary battery according to the present disclosure may be used in battery cells used as a power source of small devices, and preferably, may be also used in unit batteries of medium- and large-sized battery modules including a plurality of battery cells. Preferred examples of the medium- and large-sized devices include electric vehicles, hybrid electric vehicles, plug-in hybrid electric vehicles and energy storage systems, and particularly, may be usefully used in hybrid electric vehicles and new renewable energy storage batteries in the area requiring high output.

MODE FOR DISCLOSURE

Hereinafter, examples will be described in detail to provide a further understanding of the present disclosure. However, the examples according to the present disclosure maybe modified in many different forms and the scope of the present disclosure should not be construed as limited to the examples described below. The examples of the present disclosure are provided to fully explain the present disclosure to those skilled in the art.

Example 1

SiO particles having the average particle size of 5 μm are inputted into an air classifying mill (TC-15, Nisshin engineering), and fine powder and coarse powder are removed by operation of the air classifying mill at the rotational speed of 8,000 rpm, to obtain SiO primary particles having the average particle size ($D_{50}$) of 5 μm and FWHM of 3.

SiO obtained as above as a negative electrode active material, carbon black as a conductive material and lithium polyacrylate (Li-PAA) as a binder are mixed at a weight ratio of 80:10:10, and they are added to distilled water as a dispersion medium to obtain a negative electrode slurry. The slurry is applied on a 20 μm thick copper thin film which is a current collector, and then dried. In drying, the temperature of circulating air is 60° C. Subsequently, roll pressing is performed, followed by drying in a vacuum oven of 130° C. for 12 hours, and punching in a round shape of 1.4875 cm$^2$ to manufacture a negative electrode.

Example 2

A negative electrode is manufactured by the same process as example 1 except that SiO primary particles having the average particle size ($D_{50}$) of 5 μm and FWHM of 5 are obtained by removing fine powder and coarse powder from SiO particles having the average particle size of 5 μm using an air classifying mill (the rotational speed 7,000 rpm).

Example 3

A negative electrode is manufactured by the same process as example 1 except that Mg-doped SiO primary particles having the average particle size ($D_{50}$) of 5 μm and FWHM of 3 are obtained by removing fine powder and coarse powder from Mg-doped SiO particles having the average particle size of 5 μm using an air classifying mill (the rotational speed 8,000 rpm).

Example 4

A negative electrode is manufactured by the same process as example 1 except that fine powder and coarse powder are removed from SiO particles having the average particle size of 1.5 μm using an air classifying mill (the rotational speed 7,000 rpm), followed by sintering at 850° C. for 3 hours in an Ar atmosphere together with pitch, wherein the pitch is present in an amount of 10 parts by weight based on 100 parts by weight of the SiO particles, to obtain SiO secondary particles (having the average particle size (D50) of 6 μm and FWHM of 5) formed by agglomeration of primary particles by the medium of a carbon based binder (soft carbon) obtained as a result of sintering the pitch are obtained, and the obtained SiO secondary particles are used to form a negative electrode active material layer.

Example 5

A mixture of SiO primary particles obtained in example 1 and natural graphite (particle size 16 μm) at a 10:90 weight ratio as a negative electrode active material, carbon black as a conductive material, and carboxymethyl cellulose (CMC) and styrene budadiene rubber (SBR) as binders are mixed at a weight ratio of 95.8:1:1.7:1.5. 28.9 g of distilled water is added to 5 g of the mixture to obtain a negative electrode slurry. The slurry is applied on a 20 μm thick copper thin film which is a current collector, and then dried. In drying, the temperature of circulating air is 60° C. Subsequently, roll pressing is performed, followed by drying in a vacuum oven of 130° C. for 12 hours, and punching in a round shape of 1.4875 cm$^2$ to manufacture a negative electrode.

Example 6

A negative electrode is manufactured by the same process as example 1 except that a mixture of SiO primary particles obtained in example 2 and natural graphite (particle size 16 μm) at a 10:90 weight ratio is used as the negative electrode active material.

Comparative Example 1

A negative electrode is manufactured by the same process as example 1 except that SiO primary particles having the average particle size ($D_{50}$) of 5 μm and FWHM of 0.5 are obtained by removing fine powder and coarse powder from SiO particles having the average particle size of 5 μm using an air classifying mill (the rotational speed 11,000 rpm).

Comparative Example 2

A negative electrode is manufactured by the same process as example 1 except that SiO primary particles having the average particle size ($D_{50}$) of 5 μm and FWHM of 8 are obtained by removing fine powder and coarse powder from SiO particles having the average particle size of 5 μm using an air classifying mill (the rotational speed 4,000 rpm).

Experimental Example: Performance Evaluation of Lithium Secondary Battery

For lithium secondary batteries including the negative electrodes manufactured in examples 1 to 6, and comparative examples 1 and 2, output and life performance is evaluated.

In detail, for each secondary battery, charging/discharging is performed 50 cycles at room temperature (25° C.) within 2.5 to 4.2V operating voltage range under the condition of 0.5 C/0.5 C, and life performance is evaluated by calculating capacity retention (%) as below.

Capacity retention (%)=(discharge capacity in 50th cycle/discharge capacity in first cycle)×100

Meanwhile, output performance is evaluated by calculating the resistance as below using a voltage difference resulting from discharging at 1 C-rate for 10 sec under the condition of room temperature (25° C.) and 50% state of charge (SOC).

$R(\text{resistance})=(V_{max}-V_{min})/I(\text{current})$

The following tables 1 and 2 show the performance evaluation results of each battery.

TABLE 1

| | Negative electrode active material (SiO alone) | | | Life performance (Capacity retention, %) |
|---|---|---|---|---|
| | Type | Average particle size[1] (μm) | FWHM[2] | Output performance[3] |
| Example 1 | SiO primary particles | 5 | 3 | 99 | 69 |
| Example 2 | SiO primary particles | 5 | 5 | 100 | 70 |
| Example 3 | Mg-doped SiO particles | 5 | 3 | 99 | 88 |
| Example 4 | Secondary particles formed by agglomeration of SiO primary particles | 6 | 5 | 102 | 80 |
| Comparative example 1 | SiO primary particles | 5 | 0.5 | 96 | 49 |
| Comparative example 2 | SiO primary particles | 5 | 8 | 91 | 60 |

[1] Value measured by Laser Diffraction Method: Microtrac MT 3000
[2] Value calculated by Lorentzian distribution
[3] Output performance is a ratio relative to the measured resistance of example 2 being set to "100"

As can be seen from Table 1, examples 1 to 4 using SiO particles satisfying the average particle size (D50) of 1 to 20 μm and FWHM of 2 to 6 as the negative electrode active material show better output performance and life performance than comparative examples 1 and 2 using SiO particles outside the above-described FWHM range.

TABLE 2

| | Negative electrode active material (Mixture of SiO and natural graphite) Type | | Output performance | Life performance (Capacity retention, %) |
|---|---|---|---|---|
| Example 5 | SiO primary particles (particle size 5 μm, FWHM[2] 3) | Natural graphite | 99 | 85 |
| Example 6 | SiO primary particles (particle size 5 μm, FWHM[2] 5) | Natural graphite | 100 | 87 |

[1] Value measured by Laser Diffraction Method: Microtrac MT 3000
[2] Value calculated by Lorentzian distribution
[3] Output performance is a ratio relative to the measured resistance of example 6 being set to "100"

From Table 2, it can be seen that when SiO particles satisfying the average particle size (D50) of 1 to 20 μm and FWHM of 2 to 6 are used together with natural graphite as in examples 5 and 6, life performance further improves while maintaining the output performance.

What is claimed is:

1. A negative electrode active material for a lithium secondary battery, comprising:
   silicon oxide particles and graphite,
   wherein the silicon oxide particles have a full width at half maximum peak ranging between 3 and 5 μm in a particle size distribution on a volume percent basis and the silicon oxide particles have an average particle size (D50) of 1 μm to 20 μm,
   wherein the silicon oxide particles comprise doped silicon oxide particles doped with a metal of lithium, magnesium, calcium, or aluminum,
   wherein a weight ratio of graphite to silicon oxide is 99:1 to 70:30,
   wherein the graphite comprises natural graphite, and
   wherein the full width at half maximum peak is calculated by fitting the particle size distribution curve using Lorentzian distribution, and determining a width at one-half of a peak in the distribution curve of a single peak.

2. The negative electrode active material for the lithium secondary battery according to claim 1, wherein the average particle size (D50) of the silicon oxide particles is 3 μm to 10 μm.

3. The negative electrode active material for the lithium secondary battery according to claim 1, wherein the silicon oxide particles are represented by $SiO_x$, wherein $0<x\leq2$.

4. The negative electrode active material for the lithium secondary battery according to claim 1, wherein the silicon oxide particles comprise at least one of primary particles and secondary particles formed by agglomeration of the primary particles.

5. A negative electrode comprising:
   a current collector; and
   a negative electrode active material layer disposed on at least one surface of the current collector,
   wherein the negative electrode active material layer comprises the negative electrode active material for the lithium secondary battery according to claim 1.

6. A lithium secondary battery comprising the negative electrode according to claim 5.

7. The negative electrode active material for the lithium secondary battery according to claim 1, wherein the metal is magnesium.

8. The negative electrode active material for the lithium secondary battery according to claim 1, wherein the weight ratio of graphite to silicon oxide is 99:1 to 90:10.

9. The negative electrode active material for the lithium secondary battery according to claim 1, wherein the weight ratio of graphite to silicon oxide is 95:5 to 90:10.

* * * * *